No. 811,960. PATENTED FEB. 6, 1906.
H. A. SEIDEL.
MOUNTING FOR EYEGLASSES.
APPLICATION FILED OCT. 27, 1905.
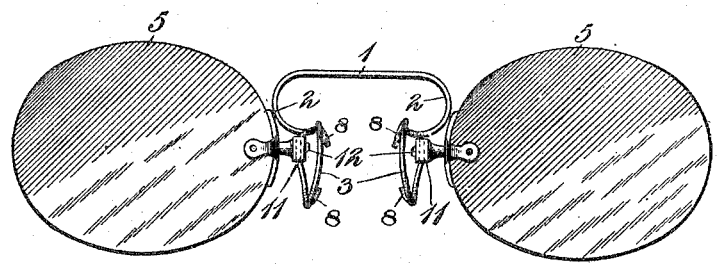
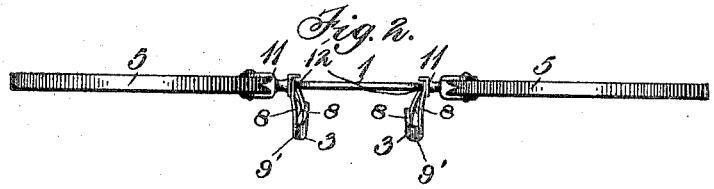
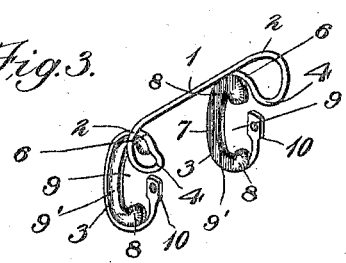
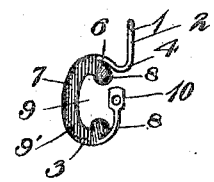
Witnesses
W. H. Ourand
W. Parker Reinohl
Inventor
Harry A. Seidel
By D. C. Reinohl
Attorney

UNITED STATES PATENT OFFICE.

HARRY A. SEIDEL, OF LEBANON, PENNSYLVANIA.

MOUNTING FOR EYEGLASSES.

No. 811,960. Specification of Letters Patent. Patented Feb. 6, 1906.

Application filed October 27, 1905. Serial No. 284,720.

*To all whom it may concern:*

Be it known that I, HARRY A. SEIDEL, a citizen of the United States, residing at Lebanon, in the county of Lebanon and State of Pennsylvania, have invented certain new and useful Improvements in Mountings for Eyeglasses; and I do hereby declare the following to be a full, clear, and exact description of the invention, such as will enable others skilled in the art to which it appertains to make and use the same.

My invention relates to mountings for eyeglasses, has for its object a mounting in which the bridge or spring and the guards are integral, and consists in certain improvements in construction, which will be fully disclosed in the following specification and claims.

In the accompanying drawings, which form part of this specification, Figure 1 represents a front elevation of a pair of eyeglasses provided with my improved mounting; Fig. 2, an inverted plan view of the same; Fig. 3, a perspective of the mounting detached and on an enlarged scale, and Fig. 4 an elevation or plan view of one of the guards detached.

Reference being had to the drawings and the designating characters thereon, the numeral 1 indicates the bridge or spring, usually designated as the "bow or bridge-piece." In the present instance it consists of a normally straight or horizontal round rod bent downward at 2 2 at each end to afford tension to the spring to cause the guards 3 3 to grip and securely hold the glasses on the nose of the wearer.

4 4 indicate another bend in each end of the spring, the bend being upward and opposite or substantially at right angle to the bend 2, which augment the tension of the mounting, and as the glasses or lenses 5 are separated or pulled apart the upper ends of the guards approach each other, and thereby tighten or increase their grip on the nose.

From the bends 4 4 the bridge or spring extends upward at 6 6 and terminates in the guards 3 3, which in form or contour resemble the letter "C," are provided with ridges 7 on their inner surfaces, inward projections or protuberances 8 8, which are embedded in the flesh of the nose by the tension of the spring and in conjunction with the opening 9 9 in the guards, which is filled with the flesh of the wearer, securely hold the eyeglasses in position and prevent their being accidentally displaced on the nose.

The guards 3 3 are formed by displacing the metal in a suitable die and forming an inwardly-projecting flange 9', which increases their bearing-surface, and are provided at their ends with lugs 10 10, to which the posts 11 11, engaging the lenses, are secured by screws 12 12, and are so located by being bent back or outward that the screws cannot come in contact with the nose.

The guards are slightly concavo-convex, which increases their gripping power and assists in holding the glasses in position.

The bridge or spring and the guards being made in one continuous piece of metal greatly reduces the liability of the mounting becoming loose by the wear and tear upon the screws, as in mountings in which the spring and the guards are separate and secured by screws.

The mounting is preferably made by the use of formers or dies for bending the bridge or spring at its ends after the guards have been formed in a suitable male and female die; but it is obvious that the bending of the spring may be done by hand with suitable pliers constructed for the purpose.

Having thus fully described my invention, what I claim is—

1. An eyeglass-mounting comprising a bridge or spring having guards formed integral therewith on the ends thereof, said guards having an opening therein and provided with laterally-extending flanges, and lugs on the free ends of the guards for attaching posts thereto.

2. An eyeglass-mounting comprising a bridge or spring having guards formed integral therewith on the ends thereof, said guards having an opening therein and provided with inwardly-extending flanges, and protuberances, and lugs for attaching posts thereto.

3. An eyeglass-mounting comprising a rod-like bridge or spring having integral guards at the ends thereof provided with an opening, and laterally-extending flanges bounding part of the opening, and lugs for attaching posts thereto.

4. An eyeglass-mounting comprising a bridge or spring having bends at the ends thereof and terminating in open guards integral therewith and having inwardly-extending flanges, and lugs at the ends of the guards.

5. An eyeglass-mounting comprising a bridge or spring having a bend at each end, a bend adjacent the first bend, guards integral with the bridge at the ends thereof, approximately C-shaped, and provided with laterally-extending flanges, and lugs.

In testimony whereof I affix my signature in presence of two witnesses.

HARRY A. SEIDEL.

Witnesses:
    WALTER C. GRAEFF,
    W. L. GELBACH.